(12) United States Patent
Li et al.

(10) Patent No.: US 7,915,989 B2
(45) Date of Patent: Mar. 29, 2011

(54) MAGNETIC ELEMENT AND MAGNETIC CORE ASSEMBLY HAVING REDUCED WINDING LOSS

(75) Inventors: Wen-Hua Li, Taoyuan Hsien (TW);
Gui-Song Huang, Taoyuan Hsien (TW);
Hai-Feng Fan, Taoyuan Hsien (TW);
Jui-Chu Cheng, Taoyuan Hsien (TW);
Su-Chiung Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 292 days.

(21) Appl. No.: 11/751,375

(22) Filed: May 21, 2007

(65) Prior Publication Data

US 2008/0150665 A1    Jun. 26, 2008

(30) Foreign Application Priority Data

Nov. 22, 2006  (TW) ................................ 95143212 A

(51) Int. Cl.
*H01F 27/29*  (2006.01)
*H01F 27/28*  (2006.01)
*H01F 27/24*  (2006.01)

(52) U.S. Cl. ........ 336/192; 336/170; 336/180; 336/182; 336/212; 336/214; 336/220

(58) Field of Classification Search ................... 336/170, 336/180–184, 212, 214–215, 233–234, 220, 336/192

See application file for complete search history.

(56) References Cited

U.S. PATENT DOCUMENTS

| | | | | |
|---|---|---|---|---|
| 3,127,580 A | * | 3/1964 | Owen | 336/133 |
| 3,242,419 A | * | 3/1966 | Walburn | 323/334 |
| 3,509,507 A | * | 4/1970 | Specht | 336/12 |
| 3,965,408 A | * | 6/1976 | Higuchi et al. | 363/75 |
| 4,138,636 A | * | 2/1979 | Liberman | 336/165 |
| 6,807,069 B2 | * | 10/2004 | Nieminen et al. | 363/17 |
| 2002/0167821 A1 | * | 11/2002 | Xing et al. | 363/21.11 |

* cited by examiner

*Primary Examiner* — Elvin G Enad
*Assistant Examiner* — Tszfung Chan
(74) *Attorney, Agent, or Firm* — Kirton & McConkie; Evan R. Witt

(57) ABSTRACT

A magnetic element includes a magnetic core assembly and multiple winding coils. The magnetic core assembly is used for proving a closed magnetic flux path and includes a first side plate, a second side plate, a first side pillar, a second side pillar and at least two middle pillars. The first and second side pillars are arranged between the first and second side plates and respectively disposed on bilateral edges of the first and second side plates. The at least two middle pillars are arranged between the first and second side pillars and includes a first middle pillar and a second middle pillar. The winding coils are wound around the at least two middle pillars.

10 Claims, 8 Drawing Sheets

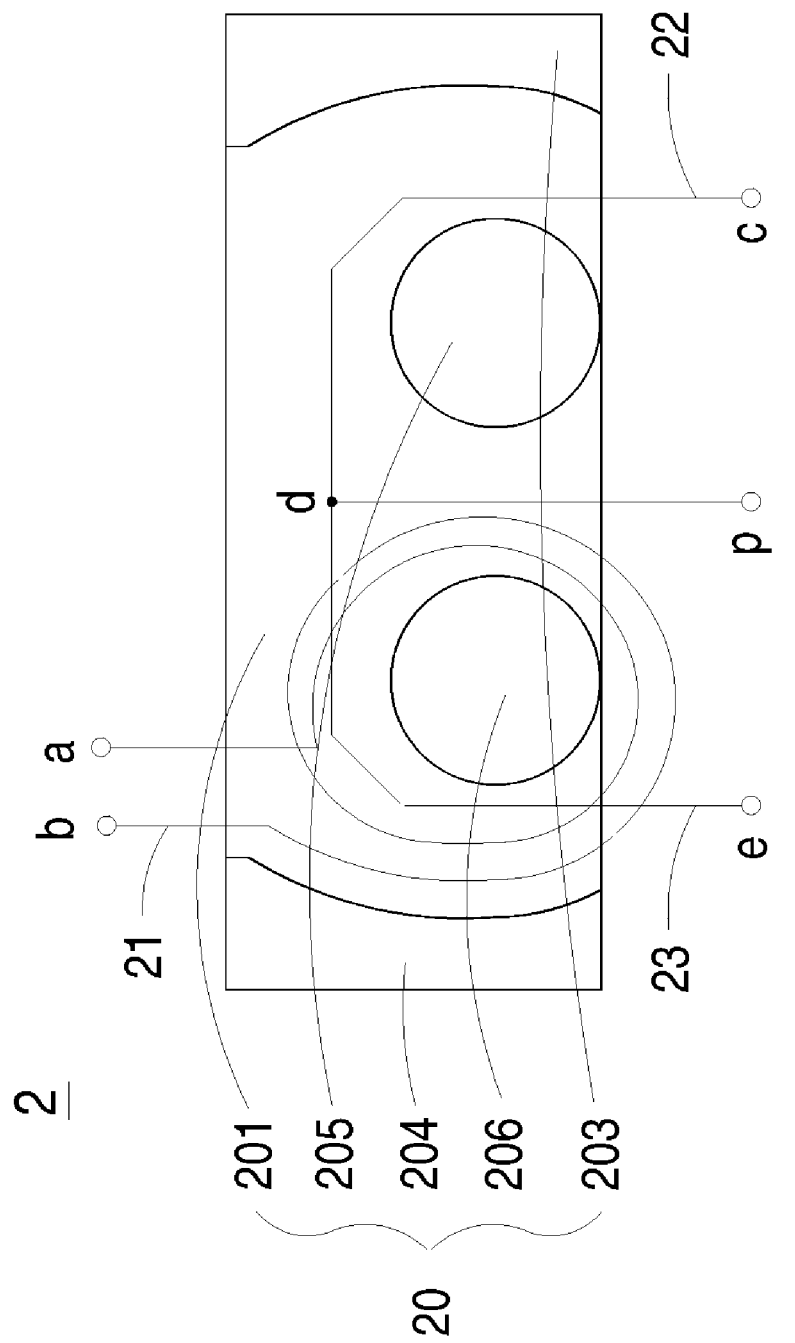

MAGNETIC ELEMENT AND MAGNETIC CORE ASSEMBLY HAVING REDUCED WINDING LOSS

FIELD OF THE INVENTION

The present invention relates to a magnetic element and a magnetic core assembly, and more particularly to a magnetic element and a magnetic core assembly with reduced winding loss.

BACKGROUND OF THE INVENTION

Nowadays, magnetic elements such as inductors and transformers are widely used in many electronic circuits to generate induced magnetic fluxes. Many conventional magnetic elements have magnetic core assemblies to form induced magnetic flux path. Depending on the material and the shapes of the magnetic core assembly, the magnetic properties of the magnetic elements are varied.

Referring to FIG. 1, a conventional transformer including a magnetic core assembly and multiple winding coils is schematically illustrated. The transformer 1 of FIG. 1 comprises a magnetic core assembly 10 and several winding coils including for example a primary winding coil 11, a first secondary winding coil 12 and a second secondary winding coil 13. The magnetic core assembly 10 includes a first side plate 101, a second side plate 102, a first side pillar 103, a second side pillar 104 and a middle pillar 105. The first side pillar 103, the second side pillar 104 and the middle pillar 105 are substantially parallel to each other, and perpendicular to the first side plate 101 and the second side plate 102. The first side pillar 103 and the second side pillar 104 are arranged on bilateral edges of the first side plate 101 and the second side plate 102. The middle pillar 105 is arranged between the first side pillar 103 and the second side pillar 104. The primary winding coil 11 is wound around the first side pillar 103 and the second side pillar 104 of the magnetic core assembly 10. For example, the primary winding coil 11 is wound around one of the first side pillar 103 and the second side pillar 104 and then wound around the other one of the first side pillar 103 and the second side pillar 104. The first secondary winding coil 12 is wound around the first side pillar 103 and separated from the primary winding coil 11. The second secondary winding coil 13 is wound around the second side pillar 104 and separated from the primary winding coil 11. A first terminal of the first secondary winding coil 12 is coupled with a first terminal of the second secondary winding coil 13 at a node "d". The magnetic core assembly 10 interacts with the winding coils 11, 12 and 13 to provide a closed magnetic flux path. When the current flowing through the primary winding coil 11 has a variation, sensing currents are generated in the first secondary winding coil 12 and the second secondary winding coil 13 due to magnetic coupling.

As known, the high assembling tolerance of the magnetic core assembly 10, the large leakage flux and the lengthy winding coils contribute to a considerable winding loss of the transformer 1. On account of high operating efficiency and low power consumption, such a transformer 1 is not feasible.

Therefore, there is a need of providing a magnetic element having reduced winding loss.

SUMMARY OF THE INVENTION

It is an object of the present invention to provide a magnetic element and a magnetic core assembly with reduced winding loss.

It is an object of the present invention to provide a magnetic element and a magnetic core assembly with reduced overall volume and weight, reduced AC magnetic flux variation and reduced leakage flux.

In accordance with a first aspect of the present invention, there is provided a magnetic element. The magnetic element includes a magnetic core assembly and multiple winding coils. The magnetic core assembly is used for proving a closed magnetic flux path and includes a first side plate, a second side plate, a first side pillar, a second side pillar and at least two middle pillars. The first and second side pillars are arranged between the first and second side plates and respectively disposed on bilateral edges of the first and second side plates. The at least two middle pillars are arranged between the first and second side pillars and includes a first middle pillar and a second middle pillar. The winding coils are wound around the at least two middle pillars.

In accordance with a second aspect of the present invention, there is provided a magnetic core assembly of a magnetic element for proving a closed magnetic flux path. The magnetic core assembly comprises a first side plate and a second side plate, a first side pillar and a second side pillar, and at least two middle pillars. The first side pillar and the second side pillar are arranged between the first and second side plates and respectively disposed on bilateral edges of the first and second side plates. The at least two middle pillars are arranged between the first and second side pillars and includes a first middle pillar and a second middle pillar, wherein multiple winding coils are wound around the first and second middle pillars.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 9 schematically illustrates a magnetic element including the magnetic core assembly of FIG. 2 with a third winding mechanism.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
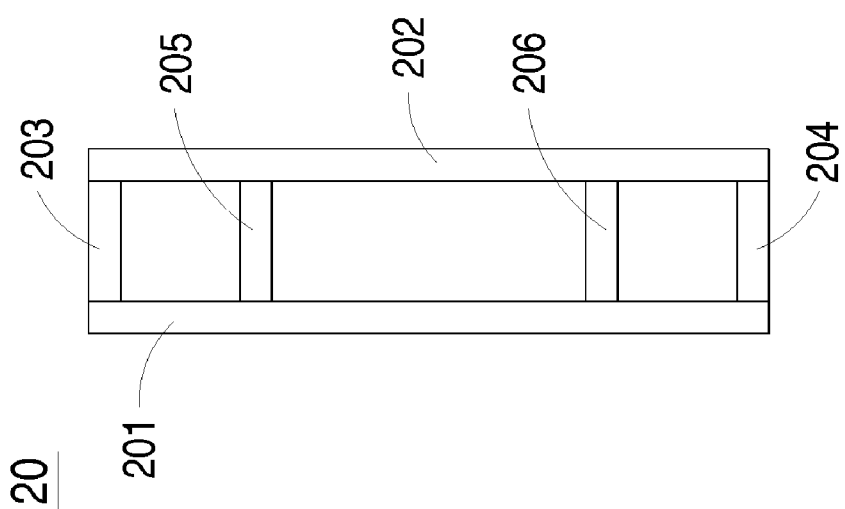
FIG. 2 schematically illustrates a magnetic core assembly according to a preferred embodiment of the present invention.

Referring to FIG. 2, a magnetic core assembly according to a preferred embodiment of the present invention is schematically illustrated. The magnetic core assembly 20 of FIG. 2 includes a first side plate 201, a second side plate 202, a first side pillar 203, a second side pillar 204 and at least two middle pillars such as a first middle pillar 205 and a second middle pillar 206. The first side pillar 203, the second side pillar 204 and the middle pillars 205, 206 are substantially parallel to each other, and perpendicular to the first side plate 201 and the second side plate 202. The first side pillar 203 and the second side pillar 204 are arranged on bilateral edges of the first side plate 201 and the second side plate 202. The middle pillars 205, 206 are arranged between the first side pillar 203 and the second side pillar 204. The middle pillars 205 and 206 are separated from the first side pillar 203 and the second side pillar 204 such that corresponding winding coils may be wound on the middle pillars 205 and 206.

Figure 1:
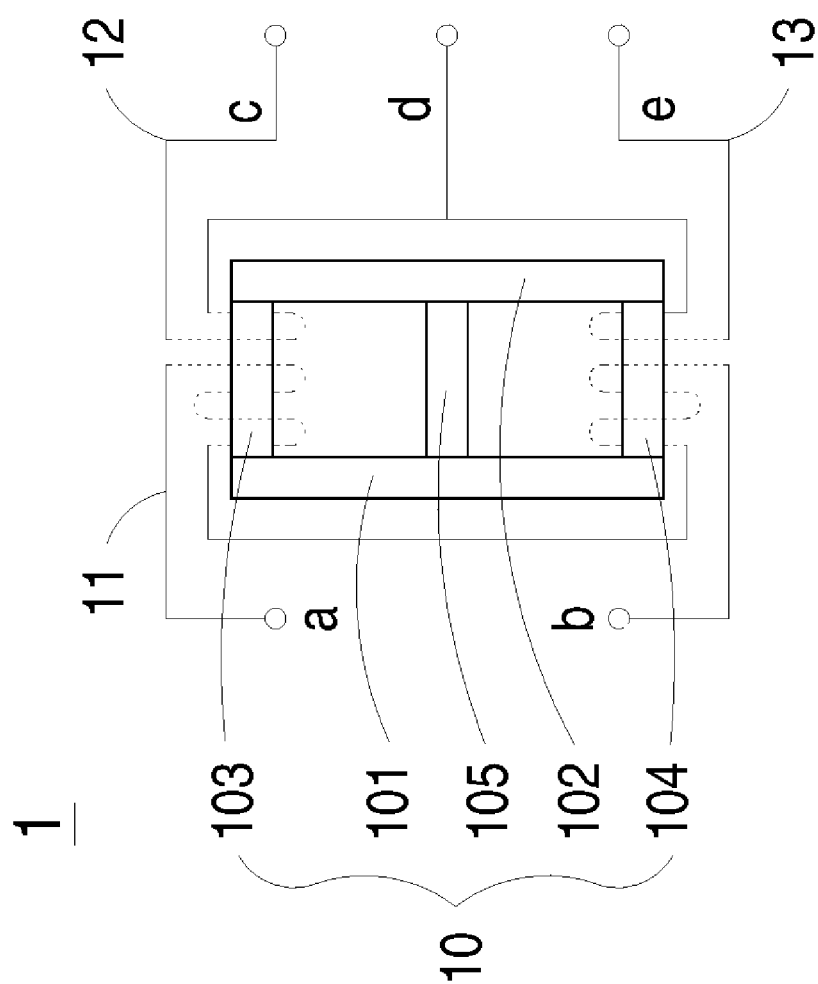
FIG. 1 schematically illustrates a conventional transformer including a magnetic core assembly and multiple winding coils.
Figure 3:
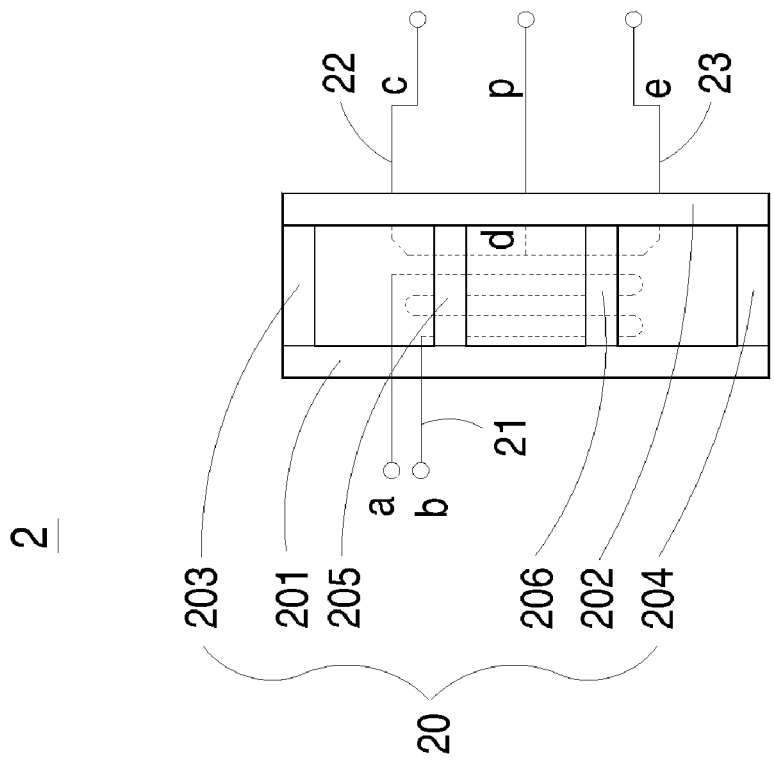
FIG. 3 schematically illustrates a magnetic element including the magnetic core assembly of FIG. 2 with a first winding mechanism.

Referring to FIG. 3, a magnetic element including a magnetic core assembly of FIG. 2 with first winding mechanism is schematically illustrated. The magnetic element 2 of FIG. 3 comprises the magnetic core assembly 20 and several winding coils including for example a primary winding coil 21, a first secondary winding coil 22 and a second secondary winding coil 23. The primary winding coil 21 is wound around both of the middle pillars 205 and 206. The first secondary winding coil 22 is wound around the first middle pillar 205 and separated from the primary winding coil 21, and the second secondary winding coil 23 is wound around the second middle pillar 206 and separated from the primary winding coil 21. A first terminal of the first secondary winding coil 22 is coupled with a first terminal of the second secondary winding coil 23 at a node "d". The magnetic core assembly 20 interacts with the winding coils 21, 22 and 23 to provide a closed magnetic flux path. When the current flowing through the primary winding coil 21 has a variation, sensing currents are generated in the first secondary winding coil 22 and the second secondary winding coil 23 due to magnetic coupling. In this embodiment, since the magnetic core assembly 20 includes the first side pillar 203, the second side pillar 204, the first middle pillar 205 and the second middle pillar 206, the magnetic coupling between the primary side and the secondary side of the magnetic element 2 is enhanced. As a consequence, the leakage flux is reduced and thus the winding loss is also reduced.

Figure 4:
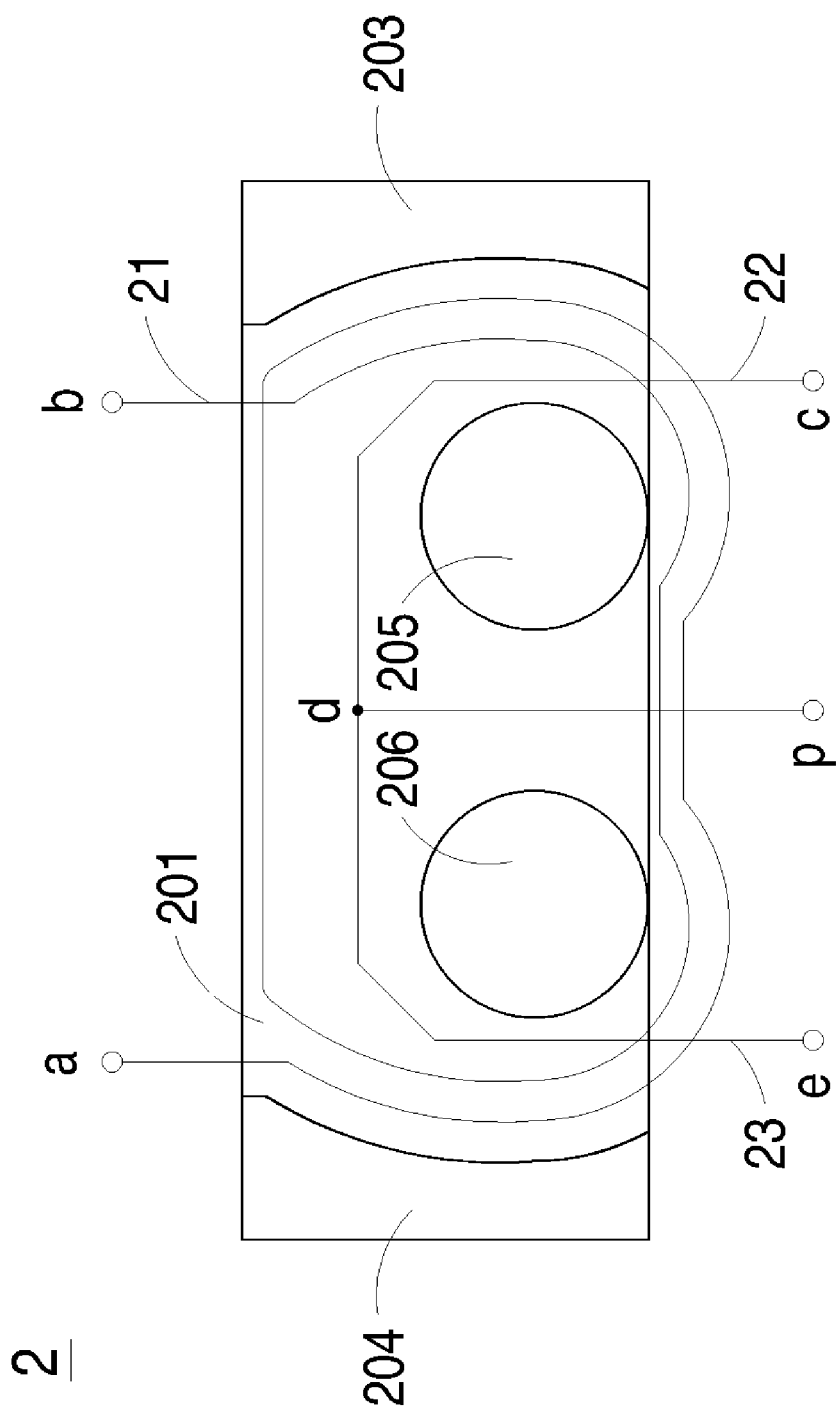
FIG. 4 is a schematic cross-sectional view of the magnetic element of FIG. 3.

FIG. 4 is a schematic cross-sectional view of the transformer of FIG. 3. The first secondary winding coil 22 is coupled with the second secondary winding coil 23 at a node "d". As shown in FIG. 4, there is only DC magnetic flux variation but no AC magnetic flux variation between the nodes "d" and "p". Therefore, the leakage flux is reduced and the winding loss is reduced. Since the closed magnetic flux path is defined by the first side pillar 203, the second side pillar 204, the first middle pillar 205 and the second middle pillar 206, the coupling efficiency of the magnetic core assembly 20 is enhanced. Moreover, as the distance between the first middle pillar 205 and the second middle pillar 206 is reduced, the overall volume of the magnetic element 2 may be reduced and the distance between the nodes "c" and "d" is also shortened. Consequently, the winding loss is further reduced.

Figure 5:
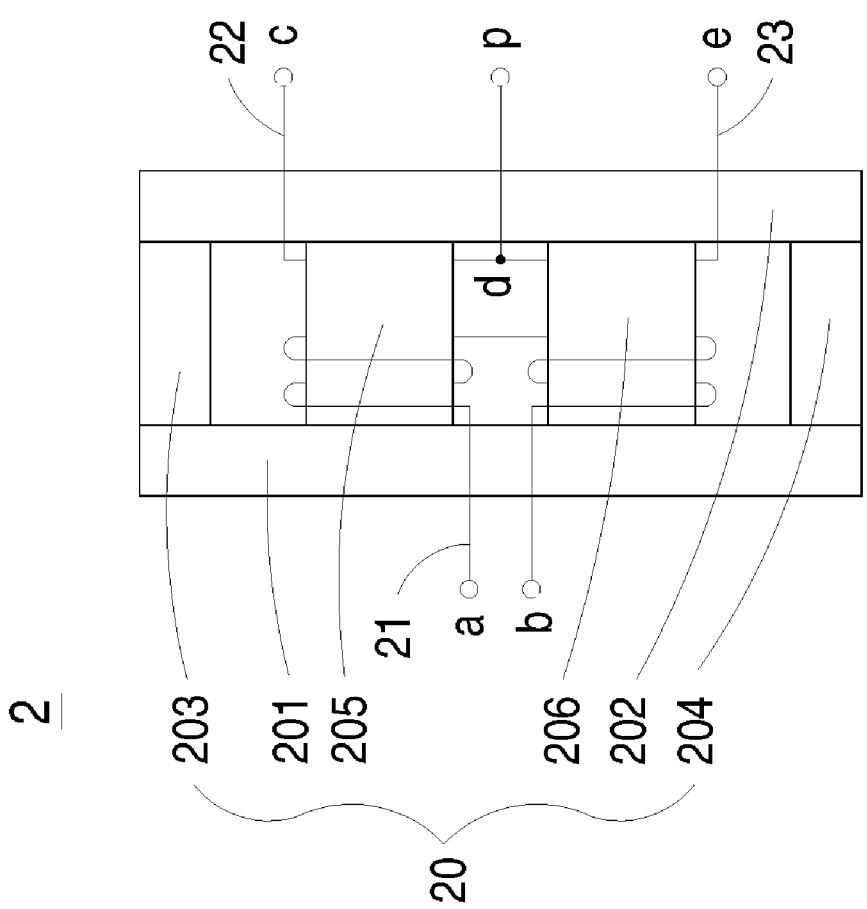
FIG. 5 schematically illustrates a magnetic element including the magnetic core assembly of FIG. 2 with a second winding mechanism.

A further embodiment of the magnetic element of the present invention is illustrated in FIG. 5. In this embodiment, the winding mechanism is distinguished from that of FIG. 3.

The magnetic element 2 of FIG. 5 also comprises the magnetic core assembly 20, the primary winding coil 21, the first secondary winding coil 22 and the second secondary winding coil 23. The primary winding coil 21 is wound around one of the first middle pillar 205 and the second middle pillar 206, and then wound around the other one of the first middle pillar 205 and the second middle pillar 206. The first secondary winding coil 22 is wound around the first middle pillar 205 and separated from the primary winding coil 21, and the second secondary winding coil 23 is wound around the second middle pillar 206 and separated from the primary winding coil 21. A first terminal of the first secondary winding coil 22 is coupled with a first terminal of the second secondary winding coil 23 at a node "d". The magnetic core assembly 20 interacts with the winding coils 21, 22 and 23 to provide a closed magnetic flux path. When the current flowing through the primary winding coil 21 has a variation, sensing currents are generated in the first secondary winding coil 22 and the second secondary winding coil 23 due to magnetic coupling. Since there is substantially no AC magnetic flux variation between the nodes "d" and "p", the winding loss is very low.

Figure 6:
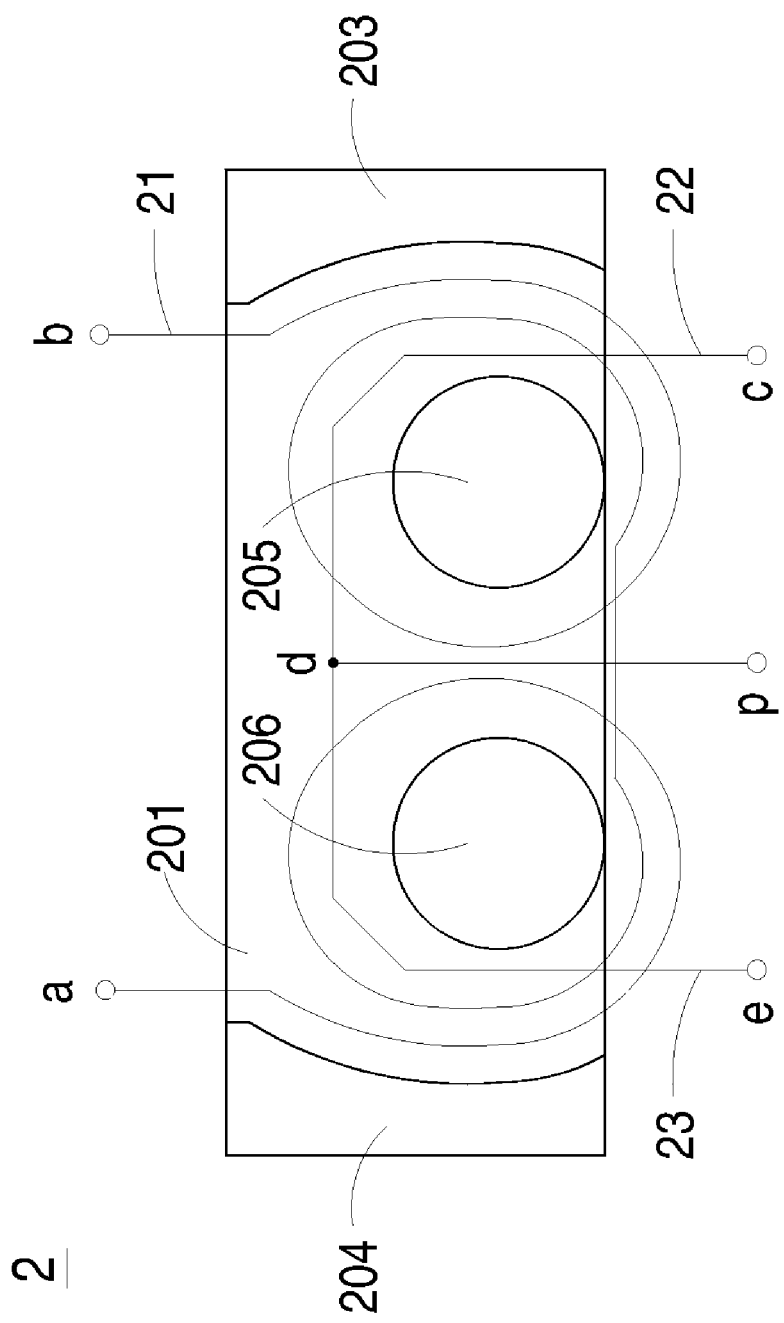
FIG. 6 is a schematic cross-sectional view of the magnetic element of FIG. 5.

FIG. 6 is a schematic cross-sectional view of the transformer of FIG. 5. The first secondary winding coil 22 is coupled with the second secondary winding coil 23 at a node "d". Moreover, as the distance between the first middle pillar 205 and the second middle pillar 206 is reduced, the overall volume of the magnetic element 2 may be reduced and the distance between the nodes "c" and "d" is also shortened. Consequently, the winding loss is further reduced.

Figure 7:
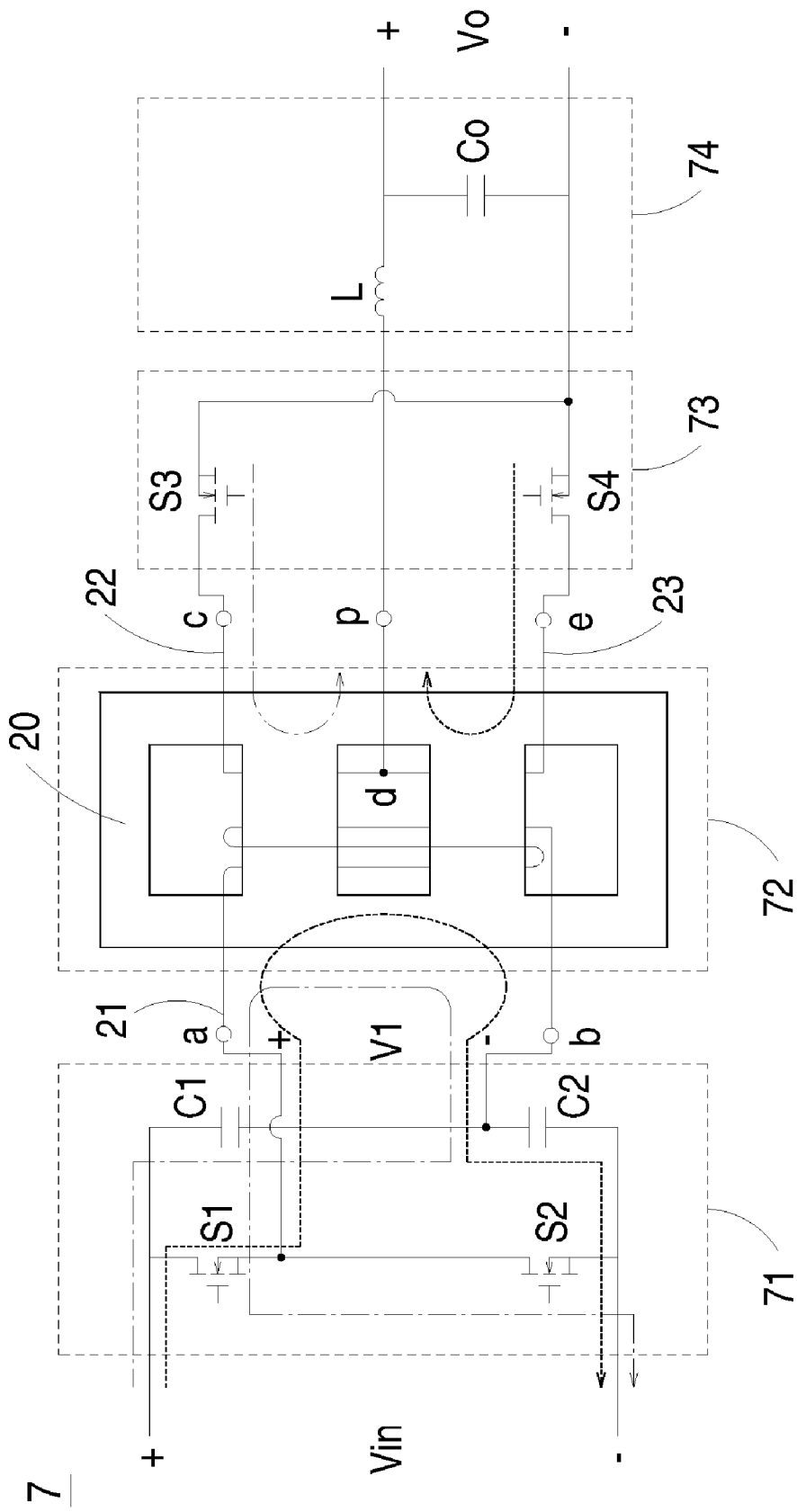
FIG. 7 is a schematic circuit diagram of the DC-to-DC converter including a magnetic element of the present invention.
Figure 8:
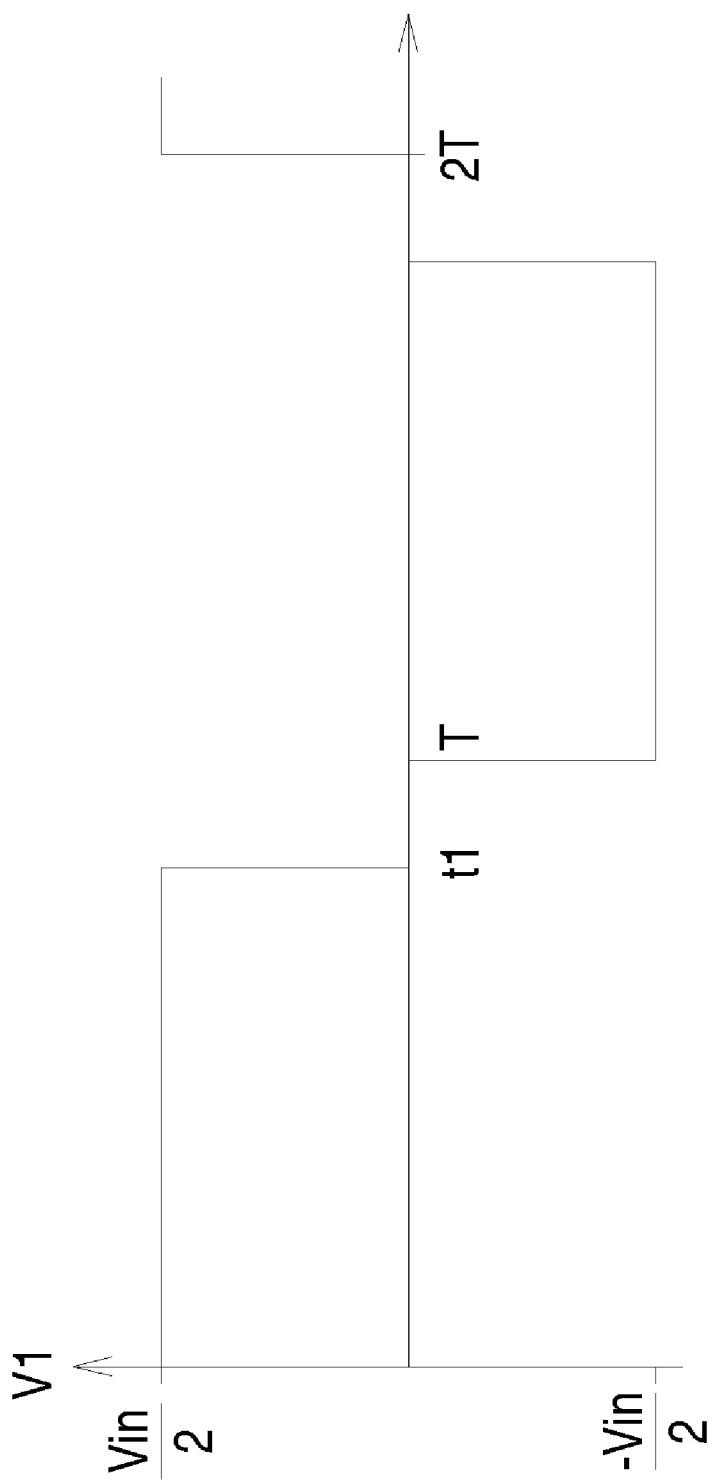
FIG. 8 is a timing waveform diagram illustrating the output voltage of the rectifying circuit of the DC-to-DC converter.

FIG. 7 is a schematic circuit diagram of the DC-to-DC converter including a magnetic element of the present invention. The DC-to-DC converter 7 of FIG. 7 is for example a half-bridge converter, and comprises an inverting circuit 71, a magnetic element 72, a rectifying circuit 73 and a filtering circuit 74. The inverting circuit 71 includes a first switch unit S1, a second switch unit S2, a first capacitor C1 and a second capacitor C2. The first capacitor C1 is electrically connected to the second capacitor C2 in series. The both ends of the series-connected capacitors C1 and C2 are connected to the input DC voltage Vin. Since the capacitance values of the capacitors C1 and C2 are equal, the voltage at the connecting point between the series-connected capacitors C1 and C2 is half of the input DC voltage Vin, as is also shown in FIG. 8. Please refer to FIG. 7 again. The connecting point between the series-connected capacitors C1 and C2 is also connected to a terminal of the primary winding coil 21 of the magnetic element 72. The other terminal of the primary winding coil 21 is electrically connected to the first switch unit S1 and the second switch unit S2. By alternatively turning on and off the first switch unit S1 and the second switch unit S2, the input DC voltage Vin is converted into an AC voltage V1 by the inverting circuit 71.

Please refer to FIG. 7 again. The magnetic element 72 has identical structure as that of FIG. 3. The primary winding coil 21 is electrically connected to the output end of the inverting circuit 71. The first secondary winding coil 22 and the second secondary winding coil 23 are electrically connected to the input ends of the rectifying circuit 73. When the current flowing through the primary winding coil 21 has a variation, sensing currents are generated in the first secondary winding coil 22 and the second secondary winding coil 23 due to magnetic coupling.

The rectifying circuit 73 is electrically connected to the first secondary winding coil 22 and the second secondary winding coil 23 of the magnetic element 72 for rectifying the DC voltages outputted from the first secondary winding coil 22 and the second secondary winding coil 23 into DC voltages. In this embodiment, the rectifying circuit 73 includes a third switch unit S3 and a fourth switch unit S4. The drain region of the third switch unit S3 is electrically connected to the first secondary winding coil 22. The drain region of the fourth switch unit S4 is electrically connected to the second secondary winding coil 23. The source drain region of the third switch unit S3 and the source drain region of the fourth switch unit S4 are electrically connected to a first output end of the rectifying circuit 73. By alternatively turning on and off the third switch unit S3 and the fourth switch unit S4, the output voltages of the first secondary winding coil 22 and the second secondary winding coil 23 are rectified into DC output voltages.

The filtering circuit 74 includes an inductor L and a filtering capacitor Co. By the filtering circuit 74, the high-frequency components included in the output voltages from the rectifying circuit 73 are filtered off, thereby regulating the output DC voltage of the filtering circuit 74.

Please refer to FIG. 7 again. When the first switch unit S1 and the fourth switch unit S4 are conducted, the second switch unit S2 and the third switch unit S3 are shut. The input current is transmitted through the first switch unit S1, the primary winding coil 21 and the second capacitor C2. Meanwhile, a sensing current is generated in the second secondary winding coil 23, which is outputted from the DC-to-DC converter 7 through the fourth switch unit S4. Whereas, when the second switch unit S2 and the third switch unit S3 are conducted, the first switch unit S1 and the fourth switch unit S4 are shut. The input current is transmitted through the first capacitor C1, the primary winding coil 21 and second switch unit S2. Meanwhile, another sensing current is generated in the first secondary winding coil 22, which is outputted from the DC-to-DC converter 7 through the third switch unit S3.

A further embodiment of a magnetic element having a third winding mechanism according to the present invention is illustrated in FIG. 9. The magnetic element 2 of FIG. 9 also comprises the magnetic core assembly 20, the primary winding coil 21, the first secondary winding coil 22 and the second secondary winding coil 23. The primary winding coil 21 is wound around one of the first middle pillar 205 and the second middle pillar 206. The first secondary winding coil 22 is wound around the first middle pillar 205, and the second secondary winding coil 23 is wound around the second middle pillar 206. A first terminal of the first secondary winding coil 22 is coupled with a first terminal of the second secondary winding coil 23 at a node "d". The magnetic core assembly 20 interacts with the winding coils 21, 22 and 23 to provide a closed magnetic flux path. When the current flowing through the primary winding coil 21 has a variation, sensing currents are generated in the first secondary winding coil 22 and the second secondary winding coil 23 due to magnetic coupling. In this embodiment, since the magnetic core assembly 20 includes the first side pillar 203, the second side pillar 204, the first middle pillar 205 and the second middle pillar 206, the magnetic coupling between the primary side and the secondary side of the magnetic element 2 is enhanced. As a consequence, the leakage flux is reduced and thus the winding loss is also reduced.

From the above description, the closed magnetic flux path defined by the two side pillars and at least two middle pillars has reduced AC magnetic flux variation. As a consequence, the leakage flux is reduced and the winding loss is reduced. Moreover, as the distance between the middle pillars is reduced, the overall volume and weight of the magnetic element may be reduced. Therefore, the magnetic element having such a magnetic core assembly is suitable for high-density mounting.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element comprising:
a magnetic core assembly for proving a closed magnetic flux path and including a first side plate, a second side plate, a first side pillar, a second side pillar and at least two middle pillars, said first and second side pillars being arranged between said first and second side plates and respectively disposed on bilateral edges of said first and second side plates, said at least two middle pillars including a first middle pillar and a second middle pillar being arranged between said first and second side pillars; and
multiple winding coils wound around said at least two middle pillars, wherein said multiple winding coils include a primary winding coil, a first secondary winding coil and a second secondary winding coil, and said first secondary winding coil and said second secondary winding coil are connected to a common node which is between said first and second middle pillars and further connected to a load, wherein there is only DC magnetic flux variation but no AC magnetic flux variation between the common node and the load.

2. The magnetic element according to claim 1 wherein said first secondary winding coil and said second secondary winding coil are wound around said first and second middle pillars, respectively.

3. The magnetic element according to claim 1 wherein said primary winding coil is wound around both of said first and second middle pillars.

4. The magnetic element according to claim 1 wherein said primary winding coil is wound around one of said first and second middle pillars and then wound around the other one of said first and second middle pillars.

5. The magnetic element according to claim 1 wherein said primary winding coil is wound around one of said first and second middle pillars.

6. A magnetic core assembly of a magnetic element for proving a closed magnetic flux path, said magnetic core assembly comprising:
a first side plate and a second side plate;
a first side pillar and a second side pillar arranged between said first and second side plates and respectively disposed on bilateral edges of said first and second side plates; and
at least two middle pillars including a first middle pillar and a second middle pillar arranged between said first and second side pillars, wherein multiple winding coils are wound around said first and second middle pillars;
wherein said multiple winding coils include a primary winding coil, a first secondary winding coil and a second secondary winding coil, and wherein said first secondary winding coil and said second secondary winding coil are connected to a common node which is between said first and second middle pillars and further connected to a load, wherein there is only DC magnetic flux variation but no AC magnetic flux variation between the common node and the load.

7. The magnetic core assembly according to claim 6 wherein said first secondary winding coil and said second secondary winding coil are wound around said first and second middle pillars, respectively.

8. The magnetic core assembly according to claim 6 wherein said primary winding coil is wound around both of said first and second middle pillars.

9. The magnetic core assembly according to claim 6 wherein said primary winding coil is wound around one of said first and second middle pillars and then wound around the other one of said first and second middle pillars.

10. The magnetic core assembly according to claim 6 wherein said primary winding coil is wound around one of said first and second middle pillars.

* * * * *